UNITED STATES PATENT OFFICE.

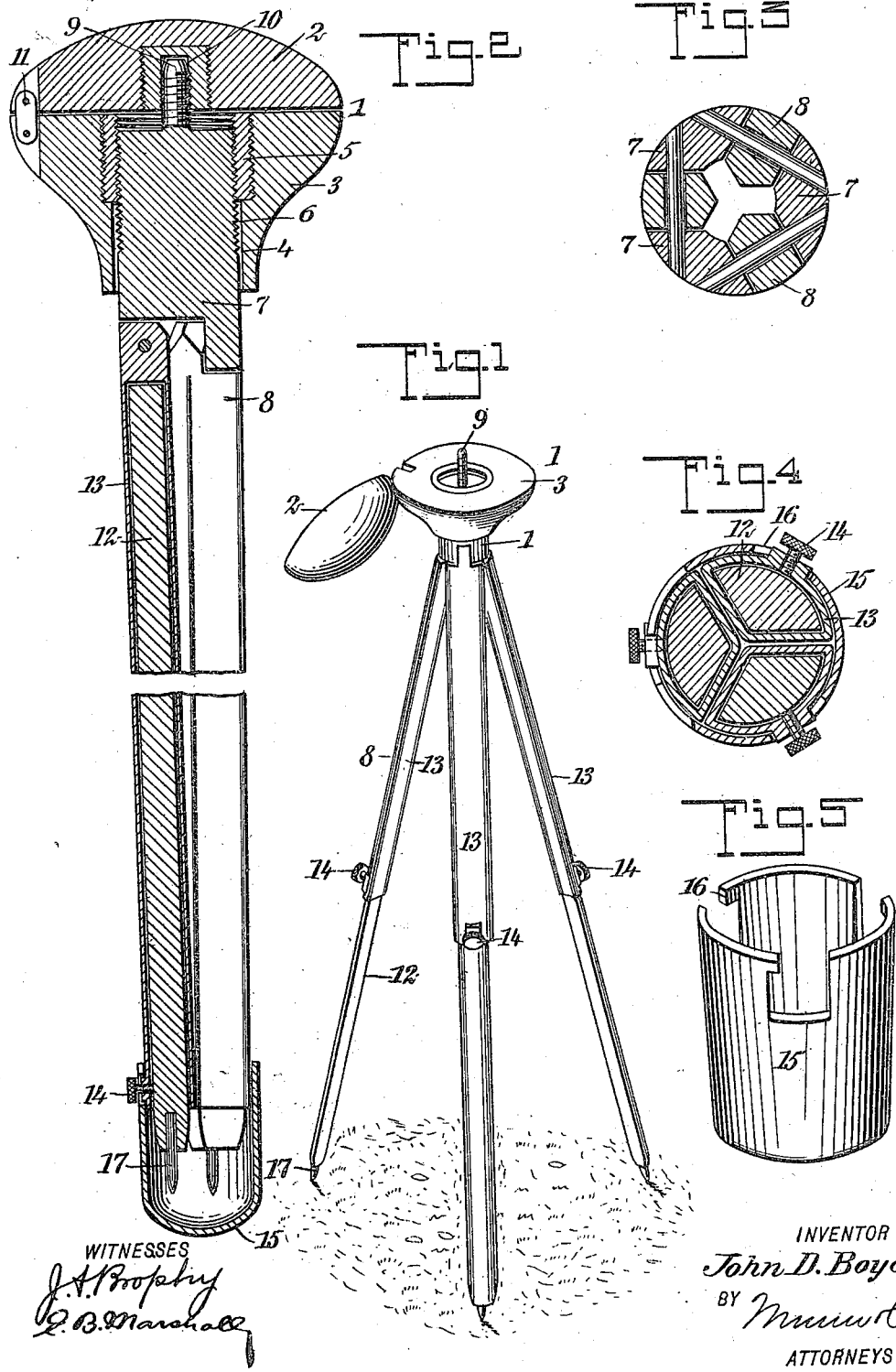

JOHN D. BOYD, OF PITTSBURG, TEXAS.

TRIPOD.

964,381.

Specification of Letters Patent. Patented July 12, 1910.

Application filed May 5, 1908. Serial No. 430,947.

*To all whom it may concern:*

Be it known that I, JOHN D. BOYD, a citizen of the United States, and a resident of Pittsburg, in the county of Camp and State of Texas, have invented a new and Improved Tripod, of which the following is a full, clear, and exact description.

An object of the invention is to provide a tripod which can be folded into such shape that it may resemble, and may be used as a walking stick.

Another object of my invention is to provide a handle for the said tripod when used as a walking stick, it being possible to open the handle in which means are provided by which a camera may be firmly secured to the tripod irrespective of the depth of the tripod socket in the camera.

Still another object is to provide a ferrule for the tripod when used as a walking stick, the ferrule being adapted to hold the legs of the camera close together.

Still other objects of the invention will appear in the following more complete description of the invention.

In this specification I will describe my preferred embodiment of the invention but I do not limit myself thereto, as I consider myself entitled to all forms and embodiments of the invention which may be held to fall within the scope of the appended claims.

Reference is to be had to the accompanying drawings, forming a part of this specification, in which similar characters of reference indicate corresponding parts in all the figures, in which—

Figure 1 is a perspective view showing the tripod in position to be used in connection with a camera; Fig. 2 is an enlarged side elevation of the same, showing the tripod head, one of the tripod legs and the ferrule in section; Fig. 3 is an enlarged sectional plan view showing the means by which the camera legs are pivoted to the head; Fig. 4 is a sectional plan view showing the lower portion of the camera legs and the ferrule engaging them; and Fig. 5 is a perspective view of the ferrule.

By referring to the drawings, it will be seen that I provide a camera head 1, which is divided into two parts, 2 and 3. The part 3 of the head 1 has an orifice 4 therethrough; and in which orifice is inserted an internally and externally threaded member 5, which is adapted to mesh with a thread 6, which is cut on the stem 7, on which the camera legs 8 are pivoted and also to mesh with the part 3 of the head. The stem 7 also has a screw 9 projecting from its upper terminal, this screw 9 being of a smaller diameter than the stem 7. The screw 9 is adapted to engage a threaded socket 10 in the upper part 2 of the head 1. The parts 2 and 3 of the head 1 are secured together by a hinge 11. As stated, the legs 8 are pivoted to the stem 7, these legs being telescopic and having their inner members 12 disposed well within the outer members 13, when the tripod is to be used as a walking stick or cane. The inner members 12, may be of wood to insure lightness, but it is preferable to make the outer members 13 of metal. Through threaded openings in the outer members 13 pass small thumbscrews 14, which are adapted to press against the inner members 12, to hold them in position relatively to the outer members 13. Over the bottom of the camera legs, which are preferably three in number, is secured a ferrule 15, which, as shown in the drawings, I attach by means of bayonet joints 16, which are adapted to engage with the stems of the thumbscrews 14 to hold the ferrule in position relatively to the legs. Points 17 are introduced in the bottom of the inner leg members 12 as is customary in tripods.

In using my invention, the ferrule 15 is removed from the legs 8 by means of a slight rotary movement which frees the bayonet joints, permitting the removal of the ferrule. The legs are then separated, and by means of the thumbscrews 14, they are adjusted to the proper length. The whole head 1 is then rotated relatively to the stem 7, so that the screw 9 is freed from the threaded socket 10 in the upper portion 2 of the head. It is then possible to open the head, the upper part 2 swinging backwardly on the hinge 11. The screw 9 is now adapted to engage with the screw thread in the tripod socket in the camera, but as the depth of these tripod sockets varies, the exposed portion of the screw 9 may be increased or lessened by the rotation of the head 1 relatively to the stem 7, so that the screw 9 will be just long enough to fit the said socket. When the photographer has taken his pictures, the camera is unscrewed from the tripod, the upper portion 2 of the head is screwed close to the lower portion 3, the inner members 12 of the legs 8 are pushed well within the outer members 13 and held in place by the thumbscrews 14 and then the ferrule is adjusted by means of the bayonet joints 16, to hold the legs together and also to provide a ferrule for the device which may now be used as a cane or walking stick.

Having thus described my invention, I claim as new and desire to secure by Letters Patent:

1. A tripod having telescopic legs which are adapted to fold together, means to hold the said legs extended at a proper length, and a ferrule which is adapted to fit the bottom of the said tripod legs and be held thereto by the said means.

2. A tripod having telescoping legs hinged to fold together, screws for securing the members of the legs in position, and a ferrule to receive the lower ends of the legs when folded, said ferrule having L-shaped slots in its upper edge to receive the said screws.

3. A tripod having a screw projecting axially from its upper end, and a head formed of two parts, movable relatively one to the other, the lower part of the head being vertically adjustable on the stem and the upper part having a threaded socket to receive the said screw.

4. A tripod having the upper end of its stem exteriorly screw threaded and provided with a screw projecting axially from said end, and a head formed of two parts, the upper part being movable with respect to the lower part and provided with a threaded socket in its inner face, and the lower part interiorly threaded and screwing on said stem.

5. A tripod, comprising a stem having a screw projecting from its upper end, telescoping legs hinged to the stem to fold together, a ferrule adapted to receive the lower ends of the legs when folded and to be secured thereto, and a two part head, the lower part being vertically adjustable on the stem and the upper part movable with respect to the lower part and with which the screw of the stem engages.

6. In a tripod, a stem, two screws thereon, legs for the tripod, the legs being pivoted to the stem, and a divided head, each division of the head having a screw thread therein, each of the screws being adapted to mesh with the screw thread in one of the divisions of the head respectively.

In testimony whereof I have signed my name to this specification in the presence of two subscribing witnesses.

JOHN D. BOYD.

Witnesses:
J. W. STANFIELD,
T. F. STAMPS.